(12) United States Patent
Favre-Reguillon et al.

(10) Patent No.: US 8,390,274 B2
(45) Date of Patent: Mar. 5, 2013

(54) METHOD AND SYSTEM FOR DETERMINING THE ACTIVITY OF A PERSON, RECORDING MEDIUM FOR THIS METHOD

(75) Inventors: Francois Favre-Reguillon, Eybens (FR); Roland Blanpain, Entre-Deux-Guiers (FR); Franck Vial, Paladru (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 379 days.

(21) Appl. No.: 12/881,346

(22) Filed: Sep. 14, 2010

(65) Prior Publication Data

US 2011/0063074 A1    Mar. 17, 2011

(30) Foreign Application Priority Data

Sep. 15, 2009 (FR) ...................... 09 56341

(51) Int. Cl.
*G01B 7/14* (2006.01)
(52) U.S. Cl. ................. 324/207.22; 340/545.3; 340/3.1; 340/573.1; 342/463; 701/469
(58) Field of Classification Search .................. 340/554; 342/464; 324/207.22
See application file for complete search history.

(56) References Cited

U.S. PATENT DOCUMENTS

| | | | |
|---|---|---|---|
| 5,682,136 A | 10/1997 | Del Signore | |
| 6,724,316 B2* | 4/2004 | Addy et al. | 340/686.1 |
| 6,841,994 B1 | 1/2005 | Wiegert | |
| 7,325,723 B2* | 2/2008 | Desjeux | 235/380 |
| 2004/0226034 A1* | 11/2004 | Kaczowka et al. | 725/9 |
| 2005/0280535 A1* | 12/2005 | Gary | 340/572.1 |
| 2006/0082488 A1 | 4/2006 | Keller | |
| 2007/0055125 A1 | 3/2007 | Anderson et al. | |
| 2007/0167722 A1 | 7/2007 | Bladen et al. | |
| 2009/0210177 A1 | 8/2009 | McCullough et al. | |
| 2011/0062947 A1* | 3/2011 | Favre-Reguillon et al. | 324/207.11 |

FOREIGN PATENT DOCUMENTS

| | | |
|---|---|---|
| EP | 1136829 A1 | 9/2001 |
| EP | 1502544 A1 | 2/2005 |
| EP | 1705617 A2 | 9/2006 |
| EP | 1731098 A1 | 12/2006 |
| WO | 91/20000 | 12/1991 |
| WO | 2009/021068 A1 | 2/2009 |

* cited by examiner

*Primary Examiner* — Richard Isla Rodas
(74) *Attorney, Agent, or Firm* — Occhiuti Rohlicek & Tsao LLP (57) ABSTRACT

This method for determining a person's activity in surroundings equipped with electrical appliances that are switchable, in response to a command from the person, between an 'on' mode and an 'off' mode, wherein the method comprises:
- the measuring of the magnetic field produced by one of the electrical appliances by means of a magnetometer carried by the person,
- the identifying of the electrical appliance in 'on' mode in proximity to the magnetometer by comparing the measured magnetic field with the pre-recorded magnetic signatures of these electrical appliances in 'on' mode, and
- the determining of the activity of the person on the basis of a pre-recorded activity identifier associated with the electrical appliance identified as being in 'on' mode on the basis of its magnetic signature.

10 Claims, 3 Drawing Sheets

METHOD AND SYSTEM FOR DETERMINING THE ACTIVITY OF A PERSON, RECORDING MEDIUM FOR THIS METHOD

CROSS-REFERENCE TO RELATED APPLICATIONS

Under 35 USC 119, this application claims the benefit of the Sep. 15, 2009 priority date of French Application No. FR0956341, the contents of which are hereby incorporated by reference in their entirety.

BACKGROUND

The invention pertains to a method and system for determining the activity of a person in an environment or in surroundings equipped with electrical appliances. The invention also pertains to an information-recording medium for implementing this method.

The surroundings or environment of a person is the space in which he is moving. Typically it is a building such as a house or an apartment.

The surroundings in which a person moves are equipped with many electrical appliances. In particular, there are many electrical appliances which can be switched over in response to a command from a person, between an 'on' mode in which the electrical appliance radiates an electromagnetic field corresponding to a characteristic magnetic signature and an 'off' mode in which the electrical appliance does not radiate any electromagnetic field or radiates an electromagnetic field corresponding to a magnetic signature different from the one characterizing the same appliance in 'on' mode.

In many applications, it is necessary to monitor the activity of a person in his surroundings. For example, this is useful when the monitored person is an elderly person living alone in his home. Indeed, there are classification charts (for example the AGGIR chart in France) which uses surveys of the person's activity to classify him at a level of dependency. This level of dependency is then used to provide him with appropriate assistance.

Hitherto, a person's activity has been recorded manually by another person, for example a health-care professional. This procedure is impractical and unreliable.

A solution can also be envisaged where this task is simplified by equipping the person's surroundings with numerous sensors such as cameras in order to monitor this person's activity. However, this makes it necessary to implement numerous sensors in this person's surroundings and proves to be highly intrusive.

SUMMARY

The invention seeks to overcome this drawback by proposing a simple method for determining a person's activity. An object of the invention therefore is a method for determining a person's activity, the method comprising:

the measuring of the magnetic field produced by one of the electrical appliances by means of a magnetometer carried by the person, the identifying of the electrical appliance in 'on' mode in proximity to the magnetometer by comparing the measured magnetic field with the pre-recorded magnetic signatures of these electrical appliances in 'on' mode, and the determining of the activity of the person on the basis of a pre-recorded activity identifier associated with the electrical appliance identified as being in 'on' mode on the basis of its magnetic signature.

The above method profitably uses the fact that many of the activities of a person involve the switching of an electrical appliance between the 'off' and 'on' modes and that an electrical appliance in operation produces a characteristic magnetic signature of this appliance. This means that by identifying the electrical appliance in 'on' mode in proximity to a person using a magnetometer carried by the person, two pieces of information are obtained simultaneously:

the identifier of the appliance proximate to the person, and the fact that this appliance is in 'on' mode.

The totaling of these two pieces of information enables the deducing, with a high degree of certitude, that it is truly the person carrying the magnetometer that is using the electrical appliance in question. Now since the use of an electrical appliance by the person very often represents a particular activity of this person, it is then possible to deduce the activity of this person from the identifier of the electrical appliance used.

Through the above method, it is no longer necessary to manually make reports on the activities of the person. Indeed, at least one part of these reports can be made by means of the above method.

Furthermore, the method is simple to implement since it does not make it necessary to modify existing electrical appliances in the surroundings or add new specific electrical appliances to the surroundings of this person except for the magnetometer carried by this person.

The embodiments of this method may comprise one or more of the following characteristics:

the method also comprises the determining of the person's activity from pre-recorded items of information on the localization, in the surroundings, of the electrical appliance identified;

the method comprises the filtering of the magnetic field measured to perform the identifying step solely on the basis of the spectral components of the measured magnetic field that are greater than 10 Hz;

for surroundings furthermore equipped with fixed magnetic disturbing units capable of producing a local disturbance of the terrestrial magnetic field, the method comprises:

the measuring of the disturbed terrestrial magnetic field by means of a magnetometer carried by the person, and the identifying of the local disturbance in which the magnetometer is situated by comparing the disturbed terrestrial magnetic field measured with pre-recorded magnetic signatures of local disturbances of the terrestrial magnetic field that are measurable in this surroundings, and the determining of the activity of the person on the basis of the pre-recorded items of information on the localization in the surroundings of the local disturbance identified by its magnetic signature;

the method comprises the measurement, by means of a magnetometer, of an angle between a reference direction of the magnetometer attached to the person and the magnetic north and the determining of the activity of the person on the basis of this angle;

the method comprises the comparing of a characteristic of the magnetic field measured by the magnetometer with a predetermined threshold and the inhibiting of the identification of the electrical appliance if this characteristic crosses this predetermined threshold and, if not, the continuing of the identification of the electrical appliance;

determining the activity of the person consists in automatically retrieving at least one identifier of activity associated with the identified appliance from a data base.

These embodiments of the method furthermore have the following advantages:

using pre-recorded information items on the localization of the identified electrical appliance makes it possible to specify the determining of the activity of the person, using only high-frequency components which are multiples of 50 Hz or 60 Hz of the measured magnetic field makes the method independent of the terrestrial magnetic field and therefore of the place in which it is implemented on the globe, using local disturbances of the terrestrial magnetic field improves the localization and determining of the activity of this person, measuring the angle between the reference direction of the magnetometer and the magnetic north furthermore gives an indication of the orientation of this person in his surroundings, thus specifying the activity of this person, and inhibiting the identification of the electrical appliance if a characteristic of the measured electromagnetic field crosses a predetermined threshold prevents unnecessary processing operations.

An object of the invention is also an information-recording medium comprising instructions to implement the above method when these instructions are executed by an electrical computer.

Finally, an object of the invention is also a system for determining the activity of a person in surroundings in which the system comprises:

a magnetometer carried by the person, a data base containing pre-recorded magnetic signatures of electrical appliances present in the surroundings, each of these electrical appliances being switchable, in response to a command from the person, between an 'on' mode in which the electrical appliance radiates an electromagnetic field corresponding to a characteristic magnetic signature and an 'off' mode in which the electrical appliance does not radiate any electromagnetic field or radiates an electromagnetic field corresponding to a magnetic signature different from the one characterizing the same appliance in 'on' mode, each of the magnetic signatures contained in the data base being capable of enabling the identification of the electrical appliance in 'on' mode from among the different electrical appliances present in the surroundings, and a computer capable of:
identifying the electrical appliance in 'on' mode in proximity to the magnetometer by comparison of the electromagnetic field measured by the magnetometer with the pre-recorded magnetic signatures pre-recorded in the database, and determining the activity of the person on the basis of at least one pre-recorded activity identifier associated with the identified electrical appliance as being in 'on' mode on the basis of its magnetic signature.

The embodiments of this system may comprise the following characteristic:

the system comprises electrical appliances present in the surroundings, the magnetic signatures of which are contained in the database, these electrical appliances being chosen from the group comprising electrical domestic appliances, lighting appliances and multimedia appliances.

BRIEF DESCRIPTION OF THE DRAWINGS

The invention will be understood more clearly from the following description, given purely by way of a non-restrictive example and made with the reference to the appended drawings, of which.

In these figures, the same references are used to designate the same elements.

DETAILED DESCRIPTION

Here below in this description, characteristics and functions well known to those skilled in the art are not described in detail.

Figure 1:
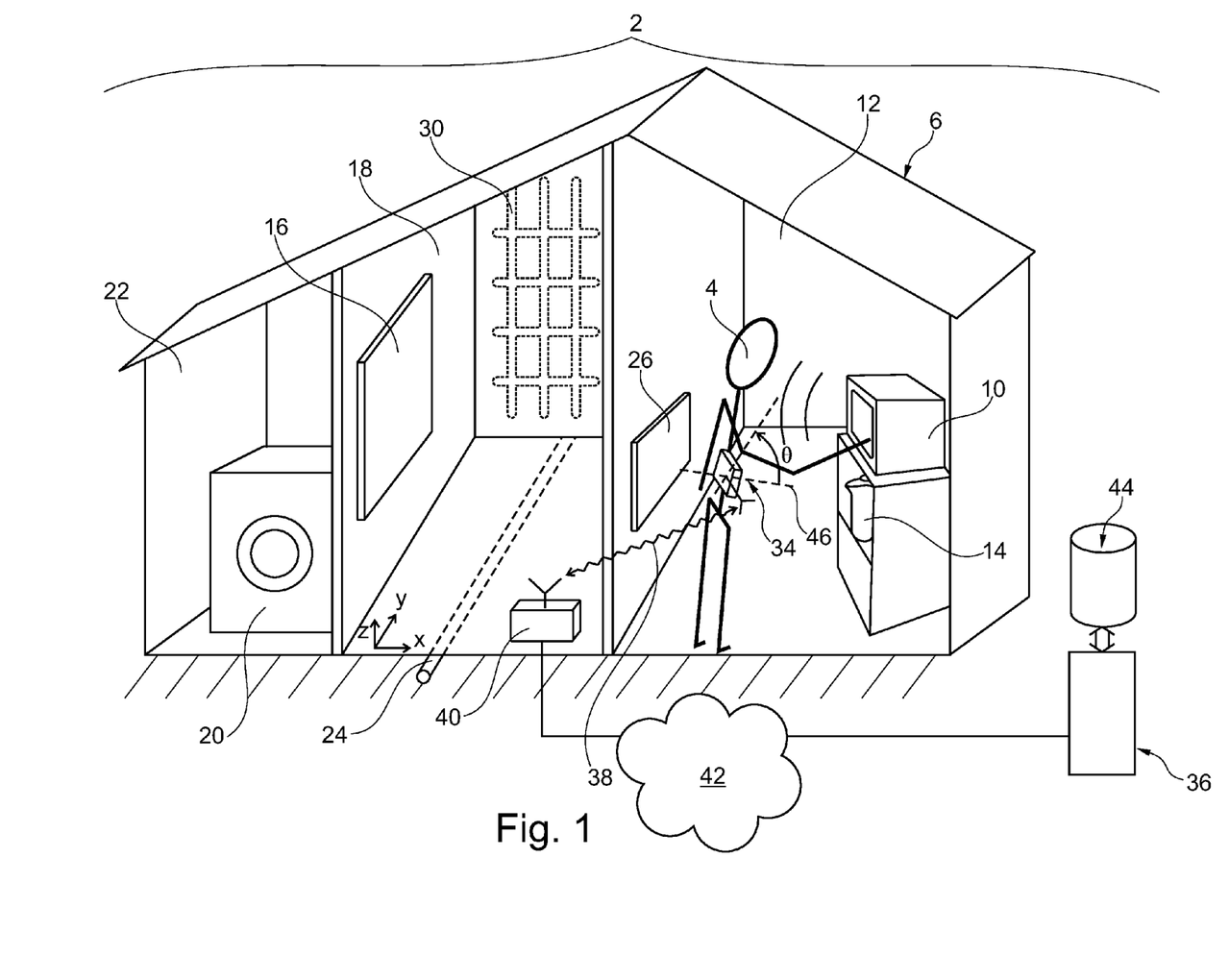
FIG. 1 is schematic illustration of a system for localizing and determining the activity of a person in his surroundings.

FIG. 1 shows a system 2 for localizing and determining the activity of a person 4 in surroundings 6. Here the surroundings 6 consist of a house 6.

The system 2 has numerous electrical appliances installed in the surroundings 6.

The electrical appliances are appliances powered by an electrical supply current. Typically, the supply current is the mains current. It is therefore essentially an alternating current whose fundamental frequency is below 100 Hz. For example, in Europe, the fundamental frequency is 50 Hz whereas in the United States it is 60 Hz. Powered electrical appliances radiate an electromagnetic field in their vicinity that varies rapidly over time. Here, we consider only the magnetic component of the field for which the propagation phenomena are negligible, the phenomenon being essentially a diffusion phenomenon. The frequency spectrum of this radiated electromagnetic field therefore has "high-frequency" components that are integer multiples of the fundamental frequency of the power supply current. Here, the term "high-frequency" is defined in relation to the DC magnetic field. The frequencies are for example frequencies of over 10 Hz. The modulus of these high-frequency components is several times greater than the background noise as long as the position is in proximity to the electrical appliance. It may be recalled that the energy of the radiated electromagnetic field decreases very rapidly with distance from the electrical appliance. For example, depending on the appliance considered, the modulus of the radiated electromagnetic field decreases proportionally to $1/R$ or $1/R^3$, where R is the distance between the appliance and the magnetometer.

Typically, the frequency spectrum of the electrical appliances shows a peak for the fundamental frequency of the power supply current and other peaks for the harmonics of the power supply current. Thus. In the case of a 50 Hz power supply current, the frequency spectrum of the electrical appliance shows peaks for the 50 Hz frequency and also for integer multiples of 50 Hz. Other appliances may also show peaks for frequencies other than the harmonics of the fundamental frequency of the power supply current. This is the case for example if the appliance creates a power supply current at a frequency different from that of the mains. Thus, there are electrical appliances capable of making a 60 Hz power supply current out of a 50 Hz power supply current or vice versa.

A fixed electrical appliance and more generally any fixed object is an object whose position does not vary in the surroundings of the person. For example, the object is fixed because:

It is rigidly fixed to an immobile support such as a wall or a ceiling, or it is difficult to transport because of its great weight.

A weight is considered to be great if it is above 5 Kg.

These electrical appliances include electrical appliances herein called "off-switchable" appliances. These off-switchable electrical appliances are electrical appliances that can be switched over in response to a command from a person between an off mode and an on mode. In the on mode, the off-switchable electrical appliances radiate an electromagnetic field corresponding to a magnetic signature characteristic of this appliance. In the off mode, the off-switchable electrical appliances do not radiate any electromagnetic field or they radiate an electromagnetic field corresponding to a magnetic signature different from the one characterizing the same appliance in on mode.

A magnetic signature of an electrical appliance and more generally of any source of a magnetic field is a discriminant set of characteristics of the magnetic field radiated by this source that enables it to be identified from among several magnetic field sources.

To simplify FIG. 1, only a few examples of electrical appliances are shown.

Here, the system 2 has the following off-switchable electrical appliances:
an oven 10 installed in a kitchen 12,
a kettle 14 also installed in the kitchen 12,
a television set 16 installed in the sitting room 18, and
a washing machine 20 installed in a laundry room 22.

These electrical appliances 10, 14, 16 and 20 have the common feature of being capable of being switched directly by the person 4 between the off mode in which the electrical appliances do not consume any electrical energy or consume very little electrical energy and the on mode in which these electrical appliances consume electrical energy. For example, the person 4 will switch these appliances between the off mode and the on mode by pressing a button.

Since their power consumption is very low or zero in the off mode, they also radiate very little electromagnetic field and therefore do not have a magnetic signature that is detectable in the background noise. Conversely, in the on mode, these appliances have a magnetic signature detectable by the system 2.

The system 2 also has electrical appliances that are not directly controllable by the person 4. For example, the appliance may be an electrical cable 24 passing through a floor or a wall of the house. It can also be an electrical convector 26 whose switching between the off mode and the on mode is automatically controlled from a temperature sensor installed in the house.

Among these electrical appliances, some are fixed while others are easily transportable by the person 4. Here, the fixed electrical appliances are the oven 4, the television set 6, the washing machine 20, the cable 24 and the convector 26. Conversely, the kettle 14 is a transportable electrical appliance.

The system 2 also has fixed magnetic disturbing elements which locally disturb the lines of the terrestrial magnetic field without in any way being thereby powered by electrical current. They can be ferromagnetic masses which, if the terrestrial magnetic field were to be eliminated, would generate no magnetic field themselves. They can also be sources of remnant magnetic fields such as magnets which generate a dc magnetic field independently of the terrestrial magnetic field or any other magnetic field source.

Only some magnetic disturbing elements have been shown in the surroundings 16. For example, the system 2 has a reinforcement 30 for a concrete wall. The metal structure of the washing machine 20 also forms a magnetic disturbing element capable of producing a detectable local disturbance of the terrestrial magnetic field.

The system 2 is equipped with a monitoring appliance 34 connected to an electronic computer 36. Here, the appliance 34 is connected to the computer 36 by means of a wireless link 38 between the appliance 34 and a receiver 40 placed in the house or by an information-transmitting network 42 connecting the receiver 40 to the computer 36. The network 42 is an information-transmission network for transmitting information over great distances, for example a telephone network or the Internet. Conversely, the link 38 is a short-distance link whose range is smaller than 100 or 300 meters.

Figure 7:
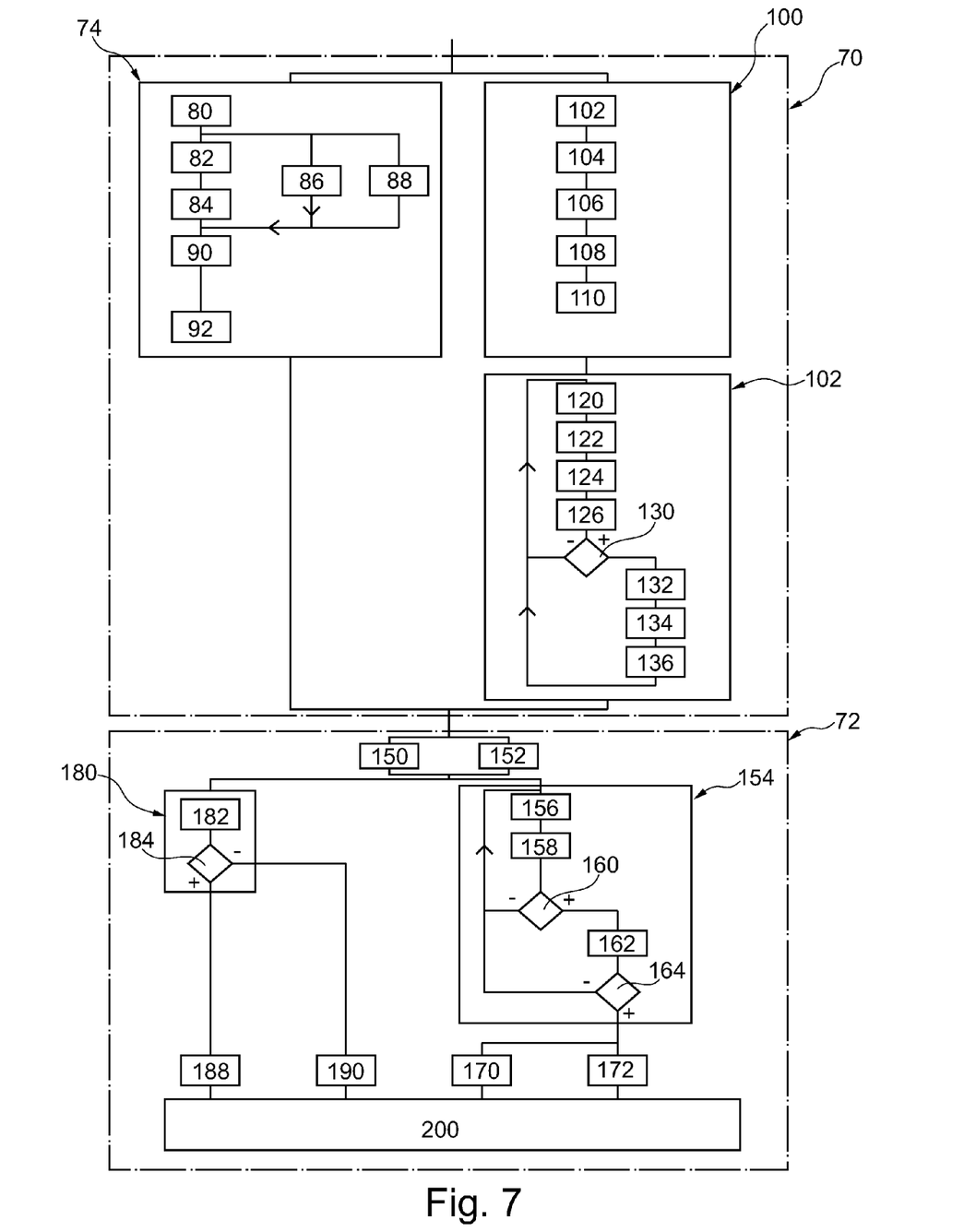
FIG. 7 is flowchart of a method for localizing and determining the activity of a person by means of the system of FIG. 1, and FIGS. 8 and 9 are illustrations of frequency spectra of two different electrical appliances.

The computer 36 is a programmable computer capable of executing instructions recorded in a non-transitory tangible information-recording medium to implement the method of FIG. 7. To this end, the computer 36 is connected to a memory 44 containing the data and instructions needed to execute the method of FIG. 7.

The appliance 34 is carried by the person 4. For example, this appliance 34 is affixed to the chest of the person 4. Here, the appliance 34 is affixed to the person 40 with sufficient rigidity so that the axes of the appliance 34 represent the orientation of the chest of the person 4. In FIG. 1, only a reference direction or axis 46 linked to the appliance 34 is shown. The orientation of the axis 46 relative to the direction of the magnetic north is indicated by an angle θ in FIG. 1. This information is called the "heading".

Figure 2:
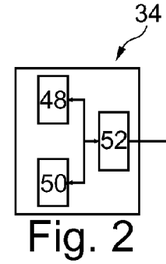
FIG. 2 is a schematic illustration of a monitoring device carried by the person monitored by the system of FIG. 1, FIGS. 3 to 6 are schematic illustrations of data bases used in the system of FIG. 1.

FIG. 2 gives a more detailed view of the appliance 34. In this embodiment, the appliance 34 comprises essentially:
an accelerometer 48 capable of measuring the acceleration of the appliance 34 along three mutually orthogonal measurement axes, and
a magnetometer 50 capable of measuring the projection of the magnetic field on three orthogonal measurement axes, constituting the referential system of the magnetometer.

The measurement axes of the accelerometer 48 and of the magnetometer 50 are collinear in order to simplify the computations.

The accelerometer 48 and the magnetometer 50 are connected to a transmitter 52 which sends out the measured and acquired data to the computer 36 by means of the link 38.

FIGS. 3 to 6 represent data bases 54, 56, 58 and 60 used to implement the method of FIG. 7. For example, these data bases are recorded in the memory 44.

Figure 3:
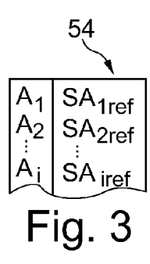

The base 54 is a base of magnetic signatures of electrical appliances. This base 54 comprises a first column containing identifiers $A_i$ of the electrical appliances and a second column associating, with each of these identifiers $A_i$ a reference magnetic signature $SA_{iref}$.

Figure 4:
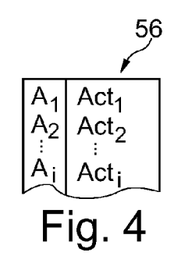

The base 56 associates an activity identifier $Act_i$ with each off-switchable electrical appliance identifier $A_i$. The identifier $Act_i$ identifies one or more activities of the person 4 associated with the use of the appliance corresponding to the identifier $A_i$. For example, if the appliance is an electrical razor or an electrical toothbrush, the activity associated with these appliances is that of washing the upper part of the body. If the electrical appliance is a cooker, a kettle, a toaster or a mixer, the associated activity is the preparation of meals. If the electrical appliance is a vacuum cleaner, the associated activity is housework. If the electrical appliance is a television set, the associated activity is watching television. These examples are not restrictive and there are many other possible activities that can be associated with the use of an off-switchable electrical appliance.

Figure 5:
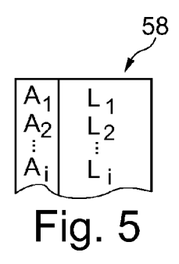

With each identifier $A_i$ of an fixed electrical appliance, the base 58 associates information items $L_i$ on its localization in the surroundings 6. The information items $L_i$ can be coordinates expressed in a fixed XYZ referential in the surroundings 6 or simply an identifier of a location such as "kitchen", "sitting room", "washroom", etc. This base 58 is therefore a mapping of the fixed electrical appliances in the surroundings 6.

Figure 6:
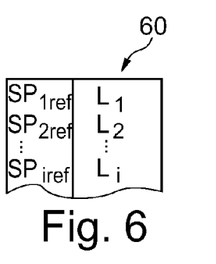

With each magnetic signature referenced $SP_{iref}$ of a local disturbance of the terrestrial magnetic field produced by a fixed magnetic disturbing element, the base 60 associates information elements $L_i$ on the position of this disturbance in the surroundings 6. As above, the information items $L_i$ can be coordinates expressed in the XYZ referential or the identifier of a location. This base 60 is a mapping of the local disturbances of the terrestrial magnetic field in the surroundings 6.

The working of the system 2 shall now be described in greater detail with reference to the method of FIG. 7.

The method runs essentially in two phases: a learning phase 70 of the system 2 followed by a phase 72 for using the system.

The phase 70 is a phase for entering information into the different data bases 54, 56, 58 and 60.

To this end, the phase 70 comprises a step 74 for entering information into the data base 60.

Before proceeding to the step 74, all the off-switchable electrical appliances present are switched to the off mode.

Then, during an operation 80, the magnetometer 50 is placed in proximity to a magnetic disturbing element of the surroundings 6 and kept unmoving at this location.

During an operation 82, the magnetometer 50 measures the magnetic field and the acquired measurements are transmitted, for example, to the computer 36.

During an operation 84, the acquired measurements are filtered so as to keep only the measurements representing the terrestrial magnetic field $H_t$. To this end, the high-frequency components of the measured magnetic field are eliminated. For example, the computer 36 implements a lowpass filter whose cut-off frequency at −3 dB is lower than or equal to 0.1 Hz.

At the same time as the operations 82 and 84, during an operation 86, the information elements $L_i$ on the current position of the magnetometer 50 in the surroundings 6 are read.

Also, at the same time as the operation 86, in an operation 88, the accelerometer 48 measures the direction of the terrestrial gravitational force G in a reference system linked to the sensor.

Then, using these different measurements, at a step 90, the computer 36 builds the signature $SP_{iref}$ of the local disturbance of the terrestrial magnetic field $H_t$ at the current position of the magnetometer 50. For example, during the operation 90, the module $Mp_i$ and the direction of the disturbed terrestrial magnetic field $H_t$ are computed from measurements made along the three measurement axes of the magnetometer 50. Furthermore, an angle $\alpha_i$ between the direction of the gravitation force G and the field $H_t$ is computed. When there is no magnetic disturbing element, the angle $\alpha_i$ is substantially equal to 30° under French conditions. If a magnetic disturbing element is present in proximity to the magnetometer 50, this modifies the direction of the lines of the terrestrial magnetic field and therefore the value of this angle $\alpha_i$. Similarly, the presence in proximity to the magnetometer 50 of a modified magnetic disturbing element also modifies the modulus of the terrestrial magnetic field. The modulus $Mp_i$ and the angle $\alpha_i$ therefore make it possible to identify a local disturbance of the terrestrial magnetic field and thus constitute a magnetic signature of this local disturbance.

During an operation 92, if the magnetic signature $SP_{iref}$ built during the operation 90 is sufficiently different from the one obtained when there is no magnetic disturbing element, then this signature is recorded in the base 60 associated with the information items $L_i$ read during the operation 86.

These operations 80 to 92 are repeated in proximity to the main fixed magnetic disturbing elements of the surroundings 6 to provide information to the data base 60. If certain magnetic disturbing elements are not visible (for example a piping system, a metal beam embedded in concrete etc), it is possible to this end to systematically move the sensor from one node to another according to a pre-set grid pattern. For example, the meshes of this grid pattern are square and the length of the side of each mesh is equal to one meter. The phase 70 may also comprise a step 100 for characterizing the high-frequency magnetic background noise of the surroundings 6 followed by a step 102 for providing information to the bases 54, 56 and 58.

Before the step 100, all the off-switchable electrical appliances are switched into off mode.

At the start of the step 100, during an operation 102, the magnetometer 50 is placed at a location considered to represent the magnetic background noise existing in the surroundings 6. Then, again during the operation 102, the magnetometer 50 measures the magnetic field and the measurements thus acquired are transmitted for example to the computer 36. The measurements are also made on successive time slots of a predetermined duration $\Delta T$. For example, the duration $\Delta T$ is equal to one second.

During an operation 104, the acquired measurements are filtered to keep only the high-frequency components of the magnetic field. For example, the measurements are filtered by means of a highpass filter whose cut-off frequency at −3 dB is equal to 10 Hz.

At an operation 106, the frequency spectrum of the magnetic field measured along each of the axes of measurement during a time slot $\Delta T$ is computed. For example, at the operation 106, a frequency spectrum is computed for each of the axes of measurement by using a Fast Fourier Transform (FFT).

Then, at an operation 108, a modulus $Ma_{0env}$ of the 50 Hz component of the measured magnetic field is computed. For example, the modulus $Ma_{0env}$ is computed from the norm of this frequency spectra of the different axes of measurement.

Once the modulus $Ma_{0env}$ has been computed, it is recorded in the memory 44 during an operation 110.

The step 102 is a step for entering information into the data bases 54, 56 and 58. To this end, at an operation 120, the magnetometer 50 is placed in proximity to an electric appliance and if necessary this electric appliance can be shifted into an on mode.

Then, at an operation 122, the magnetometer measures the magnetic field radiated by this appliance and the measurements acquired are transmitted to the computer 36. At the same time, the information items $L_i$ on the position of this appliance in the surroundings 6 are read.

As here above, the measurements of the magnetic field are made on successive time intervals $\Delta T$, for example of one second.

Then, at an operation 124, the acquired measurements are filtered by means of a high-pass filter whose cut-off frequency at −3 dB is greater than or equal to 10 Hz. For example, this operation is identical to the operation 104.

Then, at an operation 126, moduli $Ma_{jiref}$ of spectral components of the magnetic field are computed from the filtered measurements, where the indices j and i are identifiers respectively of the spectral component and of the electrical appliance. Here, the moduli $Ma_{0iref}$ to $Ma_{5iref}$ of the spectral components of the magnetic field, respectively at 50 Hz, 100 Hz, 150 Hz, 200 Hz, 250 Hz and 300 Hz are computed. The modulus $Ma_{0iref}$ is that of the component which is at the fundamental frequency of the supply current and the other moduli $Ma_{1iref}$ to $Ma_{5iref}$ are those of the components at the harmonics of the fundamental frequency. For example, each modulus $Ma_{jiref}$ is computed as described for the modulus $Ma_{0env}$.

Then, at an operation 130, the modulus $Ma_{0iref}$ is compared with the modulus $Ma_{0env}$ of the background noise. If the modulus $Ma_{0iref}$ is closer to or smaller than the modulus $Ma_{0env}$ then the computer 36 deduces from this that there is no electrical appliance in on mode, and the procedure returns to the operation 120. At this new operation 120, it is necessary either to change the place of the magnetometer to bring it closer to the electrical appliance or switch the electrical appliance into on mode if this has not already been done.

If not, the method continues with an operation 132 in which the moduli $Ma_{jiref}$ computed on several successive timeslots ΔT are averaged between one another so as to obtain an average modulus $Mam_{jiref}$ for each spectral component used here.

Then, in an operation 134, several reference ratios $P_{jiref}$ are computed. For example, the ratios $P_{jiref}$ are computed by means of the following formula:

$$P_{jiref} = Mam_{jiref}/Mam_{0iref}, \text{ for } j\in\{1,\ldots,5\}$$

The ratios $P_{jiref}$ are characteristic of the electrical appliance situated in the vicinity. Furthermore, the ratios $P_{jiref}$ have the advantage of not varying as a function of the distance between the magnetometer of the electrical appliance.

Figure 8:
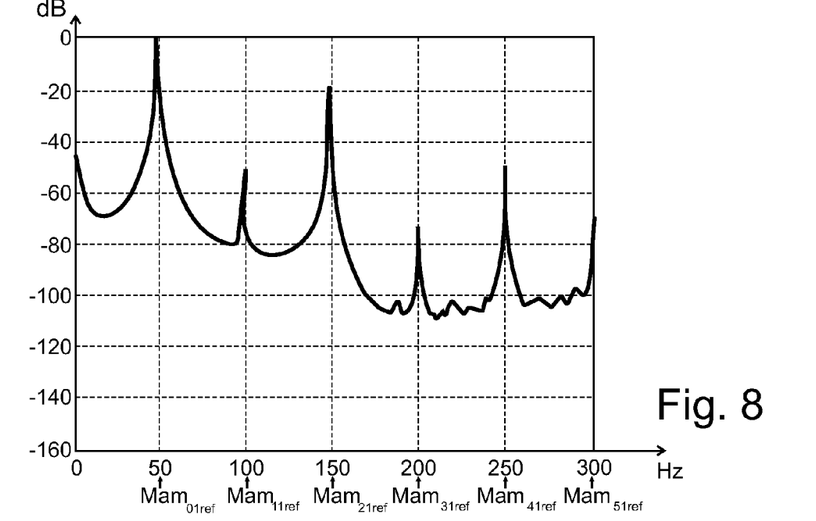
Figure 9:
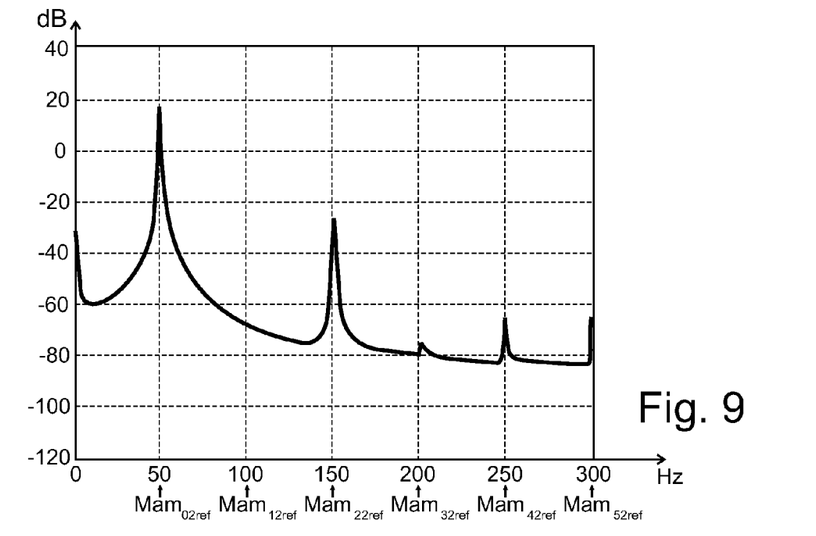

For example, the frequency spectra of a fan and a kettle, after filtering by the high-pass filter and corresponding respectively to the identifiers $A_1$ and $A_2$, have been shown respectively in FIGS. 8 and 9. The moduli $Mam_{jiref}$ are very different from one electrical appliance to another, and this fact is used here to identify them.

The different ratios $P_{jiref}$ computed for an electrical appliance corresponding to the identifier $A_i$ constitute the magnetic signature $SA_{iref}$ of this appliance.

Finally, during an operation 136, the built signature $SA_{iref}$ is recorded in the data base 54 associated with the identifier $A_i$ of the corresponding electrical appliance.

At this operation 136, if the electrical appliance whose magnetic signature has been built is a fixed electrical appliance, then the data base 58 is complemented with the information items $L_i$ on the position of this appliance read during the operation 122.

Finally, if the electrical appliance whose magnetometer signature has been built is an off-switchable electrical appliance, then the data base 56 is also complemented by associating an identifier $Act_i$ of the corresponding activity with the identifier $A_i$.

The operations 120 to 136 are reiterated for the main electrical appliances present in the surroundings 6. This therefore includes the oven 10, the kettle 14, the television set 16, the washing machine 20, the electrical conductor 24 and the convector 26.

Once the learning phase 70 has been completed, it is possible to proceed to the phase of use 72.

During the phase 72, the appliance 34 is worn, for example permanently, by the person 4.

At a step 150, the magnetometer 50 permanently measures the magnetic field. At the same time, at a step 152, the accelerometer 48 permanently measures the accelerations undergone by the appliance 34.

These measurements are transmitted to the computer 36 by means of the link 38, the receiver 40 and the network 42.

On the basis of these measurements, the computer 36 in a step 154 identifies the electrical appliance in proximity to the person 4.

To this end, in an operation 156, the measurements of the magnetometer are filtered by means of a high-pass filter. This operation 156 is identical for example to the operation 104 or 124.

Then, in an operation 158, the moduli $Ma_j$ of the spectral components respectively at the frequencies 50 Hz, 100 Hz, 150 Hz, 200 Hz, 250 Hz and 300 Hz are computed. The modules $Ma_j$ are computed as described for the moduli $Ma_{jiref}$ at the operation 126.

During the operation 160, the computed modulus $Ma_0$ is compared with the modulus $M_{0env}$ of the background noise. If the modulus $Ma_0$ is close to or smaller than the module $M_{0env}$, then the method returns to the step 156 to process the measurements made on the next time slot ΔT. Indeed, this means that there is no electrical appliance in proximity to the magnetometer 50.

If not, at an operation 162, the computer 36 builds a magnetic signature SA of the electrical appliance situated in proximity to the magnetometer 50. For example, the operation 162 is identical to the operations 132 and 134 combined except that they are applied to the measurements made at the step 150. The signature SA consists of the ratios $P_j$ between the modules $Mam_j$ and the module $Mam_0$.

Then, at an operation 164, the signature SA is compared with the signatures $SA_{iref}$ contained in the data base 54. If the signature SA corresponds to one of the reference signatures $SA_{iref}$, then the identifier of the electrical appliance $A_i$ associated with this signature $SA_{iref}$ is retrieved. When the identifier $A_i$ of an appliance is retrieved, this electrical appliance is considered to be identified. If not, no electrical appliance has been identified and the method returns to the operation 156 to process the measurements made on the following time slot ΔT.

Here, the signature SA is compared with the signatures $SA_{iref}$ using the following formula:

$$S = \Sigma P_j - P_{jiref}^2$$

The signature SA corresponds to a reference signature $SA_{iref}$ if this sum S is below a predetermined threshold.

When a fixed electrical appliance is identified, the method continues with the step 170 for localizing the person 4. This step 170 is a step for retrieving the information items $L_i$ associated with the identifier $A_i$ in the data base 58. Indeed, following the step 154, it is known that the person 24 is in proximity to the identified electrical appliance. If the identifier $A_i$ is that of a fixed appliance in the surroundings 6, then it gives an indication on the position of the person 4 in his surroundings. For example, the information items $L_i$ are sufficiently precise to give an indication of the room of the house in which the person 4 is located.

At the same time, if the identified electrical appliance is an off-switchable electrical appliance, then at a step 172 the activity of the person 4 is determined. At this step 172, the computer 36 makes a search in the data base 56 for the identifier $Act_i$ associated with the retrieved identifier $A_i$. For example, if the person 4 has switched the kettle 14 into on mode, it means with a degree of high certainty that this person 4 is preparing a meal.

At the same time as the step 154, during a step 180, the measurements of the magnetometer and the accelerometer are also used to identify a local disturbance of the terrestrial magnetic field.

To this end, in an operation 182, a magnetic signature SP of a local disturbance of the terrestrial magnetic field in which the appliance 34 is located is built. The operation 182 is identical for example to the operations 82, 84 and 90 combined except that they are applied to the measurements made during the steps 150 and 152.

Then, at a step 184, the signature SP is compared with the reference signatures $SP_{iref}$ contained in the data base 60. For example, this comparison is made as described with reference to the operation 164.

If the signature SP corresponds to one of the reference signatures $SP_{iref}$, then a local magnetic disturbance is identified.

The method continues then with a step 188 for locating the person 4 on the basis of the identified magnetic disturbance. At the step 188, the information items $L_i$ associated with the signature $SP_{iref}$ corresponding to the signature SP are retrieved in the data base 60. There is thus an indication on the position of the person 4 in his surroundings that is sufficient for example to indicate the room in which this person is located.

Should the signature SP not correspond to any of the signatures $SP_{iref}$ quite simply because the magnetometer is not in proximity to a magnetic disturbing element, then the operation proceeds to a step 190 in which the angle θ between the magnetic north and the axis 46 is read. The direction of the magnetic north is obtained from measurements made at the step 150 by the magnetometer.

At a step 200, the information obtained at the end of the steps 170, 172, 188 and 190 are processed for different ends.

For example, at the step 200, the information items on the location of the person 4 obtained at the end of the step 170 and 188 are cross-checked to specify or confirm the localizing of this person.

The information items on the localizing of the person 4 and the indications on the activity of this person at the same point in time are cross-checked to specify or confirm the activity of the person.

At the step 200, the orientation of the person obtained at the end of the step 190 and the indications on the activity of this person obtained at the step 172 are cross-checked to specify or confirm the activity of the person. For example, if it has been determined that the person 4 is watching television and that the orientation obtained at the end of the step 190 of this person 4 is incompatible with this activity, then the activity in question is not confirmed and if necessary an abnormal behavior is reported. Similarly, if the information obtained on the person's position indicates that he is in bed and if the orientation measured at the step 190 indicates that the person 4 is reclining across the bed, then a new indication of abnormal behavior is activated.

At the step 200, the different pieces of information read may be used to determine the degree of dependency of the person 4. To this end, for example, the activities read and their frequencies are compared with the "standard" behavior. Deviations in the behavior of the person compared with this standard behavior indicate a loss of independence of this person.

Many other embodiments are possible. For example, the magnetometer may be a vector magnetic sensor capable of measuring the amplitude of the projection of the magnetic field over several axes of measurement or a scalar magnetic sensor which measures the modulus of the field. The scalar magnetic sensor is preferably an isotropic scalar magnetic sensor, i.e. one whose measurement is independent of its orientation and space. A scalar magnetic sensor may prove to be less bulky and less costly.

The base 54 of signatures of the electrical appliances may be common to different surroundings of different persons.

The identification of the electrical appliances or the local disturbances of the terrestrial magnetic field can be done in real time or it can be deferred. If this identification is done in real time, then preferably the appliance 34 is replaced by an appliance equipped with a computer capable of locally performing all the computations needed for this identification. If this identification is deferred, the architecture of the system 2 as described here is sufficient.

If several electrical appliances proximate to one another are used at the same time, techniques for separating sources of magnetic fields can be used to determine the contribution of each appliance to the magnetic field measured by the magnetometer. To this end, the following documents may be referred to:

<<Séparation aveugle de mélange convolutif de sources>> ("Blind separation of convolutive mixture of sources"), thesis by H. Boumaraf, 26 Oct. 2005, accessible at: http://www-ljk.imag.fr ou http://tel.archives-ouvertes.fr/tel-00011643/fr/

The background noise used to determine the absence of an electrical appliance proximate to the magnetometer can be a temporal mean of the evolution of the electromagnetic field measured over a time range or an instantaneous amplitude of this measured magnetic field or a combination of the module of the measured magnetic field for several frequencies.

The localization of the person 4 using local disturbances of the terrestrial magnetic field can be omitted in order to simplify the method.

Similarly, the measurement of the orientation of the person 4 relative to the magnetic north can be omitted.

If the distance R between the magnetometer and the electrical appliance is sufficient for this electrical appliance to be modeled as being a dipole, then it is also possible to estimate this distance R from measurements of the magnetometer. The distance thus estimated is then used to specify the location or activity of the person 4.

The step 100 for characterizing the background noise can also be omitted if there is no major high frequency magnetic disturbance in the surroundings 6.

Comparing a built magnetic signature with the signatures contained in a data base can be done by many different methods. For example, to this end, we may refer to the following work:

<<Apprentissage artificiel: Concepts et algorithmes>> (Artificial learning: concepts and algorithms), A. Cornuégiols-L. Miclet-Y. Kodratoff-T. Mitchel, édition Eyrolles, $2^{nd}$ édition.

In particular, the identification of the built signature can be done by learning:

by estimation of density of probability using Bayesian networks, by optimization using neural networks or vast margin separators (VMS), or by decision tree.

Magnetic signatures other than those described here can be used. For example, the magnetic signature may be a temporal evolution, characteristic of the electromagnetic field radiated by the electrical appliance. Ratios other than the ratios of the modulus of the component to the fundamental frequency can be used to characterize the magnetic field radiated by an electrical appliance. Similarly, a local disturbance of the terrestrial magnetic field can be characterized solely by its modulus $Mp_i$ or solely by the angle $\alpha_i$.

Filtering by means of a high-pass filter can be replaced by the use of a band-pass filter and preferably a band-pass filter having a bandwidth of 5 Hz to 1 kHz.

During the operation 108, the modulus $Ma_{0env}$ can be replaced by an average between different modules $Ma_{0env}$ computed on different successive time slots $\Delta T$.

A modulus $Ma_{0env}$ can be computed at a single location of the surroundings 6 or at several locations. In the latter case, if several moduli $Ma_{0env}$ are computed, either they are recorded individually in the memory 44 or the modulus $Ma_{0env}$ is replaced for the remainder of the operations by an average of these different modules $Ma_{0env}$.

As a variant, the magnetometer 50 is powered by self-induction, i.e. by using the magnetic field radiated by the electrical appliances situated in proximity.

Here, the magnetometer described is the same for measuring the high-frequency and low-frequency magnetic fields. As a variant, two different magnetometers are used, each to measure one of these magnetic fields.

The information on the localizing of an object in the surroundings can be taken by means of measuring appliances such as for example a GPS localizing appliance in surroundings where such localizing is possible.

The method for localizing people through local disturbance of the terrestrial magnetic field can be implemented independently of the other methods described here and especially independently of the method for localizing a person through electromagnetic fields radiated by fixed electrical appliances.

The invention claimed is:

1. A method for determining a person's activity in surroundings equipped with electrical appliances that are switchable, in response to a command from the person, between an 'on' mode, in which the electrical appliance radiates an electromagnetic field corresponding to a characteristic magnetic signature, and an 'off' mode, in which the electrical appliance does not radiate any electromagnetic field or radiates an electromagnetic field corresponding to a magnetic signature different from the magnetic signature characterizing the same appliance in 'on' mode, wherein the method comprises:
   measuring a magnetic field produced by one of the electrical appliances by means of a magnetometer carried by the person,
   identifying an electrical appliance in 'on' mode in proximity to the magnetometer by comparing the measured magnetic field with the pre-recorded magnetic signatures of electrical appliances in 'on' mode, and
   determining the activity the person engages in on the basis of a pre-recorded activity identifier associated with the electrical appliance identified as being in 'on' mode on the basis of its magnetic signature.

2. The method according to claim 1, further comprising determining the person's activity from pre-recorded items of information on the localization, in the surroundings, of the electrical appliance identified.

3. The method according to claim 1, further comprising filtering the magnetic field measured in performing the identifying step solely on the basis of spectral components of the measured magnetic field that are greater than 10 Hz.

4. The method according to claim 1, wherein the surroundings are equipped with fixed magnetic disturbing units capable of producing a local disturbance of the terrestrial magnetic field, the method further comprising:
   measuring the disturbed terrestrial magnetic field by means of a magnetometer carried by the person,
   identifying the local disturbance in which the magnetometer is situated by comparing the disturbed terrestrial magnetic field measured with pre-recorded magnetic signatures of local disturbances of the terrestrial magnetic field that are measurable in the surroundings, and
   determining the activity of the person on the basis of the pre-recorded items of information on the localization in the surroundings of the local disturbance identified by its magnetic signature.

5. The method according to claim 1, further comprising
   measuring, by means of a magnetometer, an angle between a reference direction of the magnetometer attached to the person and magnetic north and
   determining the activity of the person on the basis of the angle.

6. The method according to claim 1, further comprising
   comparing a characteristic of the magnetic field measured by the magnetometer with a predetermined threshold,
   inhibiting the identification of the electrical appliance if the characteristic crosses the predetermined threshold and,
   if the characteristic does not cross the predetermined threshold, continuing the identification of the electrical appliance.

7. The method according to claim 1, wherein determining the activity of the person comprises automatically retrieving at least one identifier of activity associated with the identified appliance from a data base.

8. A non transitory tangible information-recording medium having encoded thereon software for determining a person's activity in surroundings equipped with electrical appliances that are switchable, in response to a command from the person, between an 'on' mode, in which the electrical appliance radiates an electromagnetic field corresponding to a characteristic magnetic signature, and an 'off' mode, in which the electrical appliance does not radiate any electromagnetic field or radiates an electromagnetic field corresponding to a magnetic signature different from the magnetic signature characterizing the same appliance in 'on' mode, said software comprising instructions that, when executed by an electronic computer, cause said electronic computer to:
   receive data provided by a magnetometer carried by the person, said data being representative of measurements of the magnetic field produced by one of the electrical appliances,
   identify an electrical appliance in 'on' mode in proximity to the magnetometer by comparing the measured magnetic field with pre-recorded magnetic signatures of electrical appliances in 'on' mode, and
   determine the activity the person engages in on the basis of a pre-recorded activity identifier associated with the electrical appliance identified as being in 'on' mode on the basis of its magnetic signature.

9. A system for determining the activity of a person in surroundings, the system comprising:
   a magnetometer carried by the person,
   a data base containing pre-recorded magnetic signatures of electrical appliances present in the surroundings, each of the electrical appliances being switchable, in response to a command from the person, between an 'on' mode in which the electrical appliance radiates an electromagnetic field corresponding to a characteristic magnetic signature and an 'off' mode in which the electrical appliance does not radiate any electromagnetic field or radiates an electromagnetic field corresponding to a magnetic signature different from the magnetic signature characterizing the same appliance in 'on' mode, each of the magnetic signatures contained in the data base being capable of enabling the identification of the electrical appliance in 'on' mode from among the different electrical appliances present in the surroundings, and a computer capable of:
identifying the electrical appliance in 'on' mode in proximity to the magnetometer by comparison of the electromagnetic field measured by the magnetometer with the pre-recorded magnetic signatures pre-recorded in the database, and
determining the activity the person engages in on the basis of at least one pre-recorded activity identifier associated with the identified electrical appliance as being in 'on' mode on the basis of its magnetic signature.

10. The system according to claim 9, wherein the system comprises fixed electrical appliances present in the surroundings, the magnetic signatures of which are contained in the data base.

* * * * *